No. 769,197.

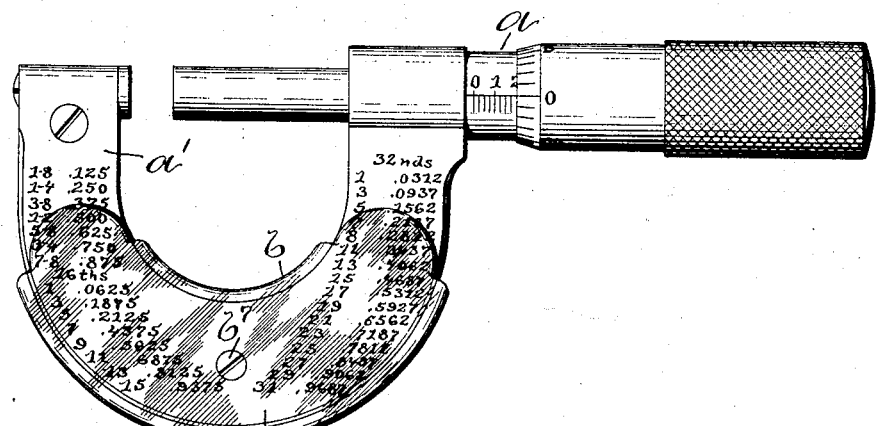

Patented September 6, 1904.

UNITED STATES PATENT OFFICE.

FRANK SPALDING, OF PROVIDENCE, RHODE ISLAND, ASSIGNOR TO BROWN & SHARPE MANUFACTURING COMPANY, OF PROVIDENCE, RHODE ISLAND.

MICROMETER-CALIPERS.

SPECIFICATION forming part of Letters Patent No. 769,197, dated September 6, 1904.

Application filed February 5, 1903. Serial No. 141,974. (No model.)

*To all whom it may concern:*

Be it known that I, FRANK SPALDING, a citizen of the United States, residing at Providence, in the county of Providence and State of Rhode Island, have invented a new and useful Improvement in Micrometer-Calipers, of which the following is a specification.

This invention has reference to an improvement in micrometer-calipers, and more particularly to an improvement in the frame of the caliper.

In micrometer-calipers for calipering articles to one one-thousandth part of an inch or less it has been found in practice that the heat generated in handling the caliper by the operator is detrimental to the true reading of the finely-adjusted instrument. The operator in holding the caliper by the frame in the usual way heats the frame, and this expands the metal of the frame and ruins the fine adjustment of the caliper.

The object of my invention is to insulate the hand of the operator from the frame of the caliper to prevent the heat of the hand from affecting the metallic frame; and my invention consists in the peculiar and novel construction of a two-part casing formed from a plastic insulating material, preferably transparent, and shaped to surround and fit the frame of the caliper, and means for securing the casing to the frame of the caliper, as will be more fully described hereinafter and pointed out in the claim.

Figure 1 is a side view of a micrometer-caliper, showing my improvement in the form of a transparent insulating-casing secured to the frame of the caliper. Fig. 2 is a view looking at the under side of the caliper, showing the insulating-casing formed in two parts. Fig. 3 is a transverse sectional view through the caliper-frame and the two-part insulating-casing, showing the screw for securing the casing to the caliper-frame; and Fig. 4 is a perspective view showing the two-part insulating-casing removed from the caliper-frame.

In the drawings, $a$ represents a micrometer-caliper having the usual U-shaped frame $a'$. The two-part insulating-casing $b$, formed, preferably, of a plastic transparent material, such as celluloid, is shaped to fit and completely surround the greater portion of the frame $a'$. The casing $b$ is constructed to form the side $b'$ with the inwardly-turned lips $b^2\ b^2$ and the countersunk screw-hole $b^3$, and the side $b^4$ with the inwardly-turned lips $b^5\ b^5$ and the embedded nut $b^6$. The screw $b^7$ is in screw-threaded engagement with the nut $b^6$ and secures the two parts of the casing $b$ to the frame $a'$ through the hole $a^2$ in the frame.

It is evident that the insulating-casing $b$ could be secured to the frame of the caliper without the use of mechanical means by molding the casing around the frame of the caliper, and, if desired, for convenience in handling the inner and outer edges of the insulating-casing may be knurled or milled, as shown in the drawings.

Having thus described my invention, I claim as new and desire to secure by Letters Patent—

In a micrometer-caliper, the combination with the frame $a'$ and the two-part insulating-casing $b$ formed preferably of a plastic transparent material, and having the side $b'$ with the inwardly-turned lips $b^2\ b^2$ and the countersunk screw-hole $b^3$, the side $b^4$ with the inwardly-turned lips $b^5\ b^5$ and the embedded nut $b^6$, and the screw $b^7$ in screw-threaded engagement with the nut $b^6$ to secure the two parts of the casing $b$ to the frame $a'$, through the hole $a^2$ in the frame, as shown and described.

In testimony whereof I have signed my name to this specification in the presence of two subscribing witnesses.

FRANK SPALDING.

Witnesses:
B. S. WEBSTER,
J. A. MILLER, Jr.